United States Patent
Prip

(10) Patent No.: US 6,644,176 B2
(45) Date of Patent: Nov. 11, 2003

(54) GRILL TOP COOKING TOOL

(76) Inventor: Peter Prip, 39 Sefton Dr., Cranston, RI (US) 02905

( * ) Notice: Subject to any disclaimer, the term of this patent is extended or adjusted under 35 U.S.C. 154(b) by 0 days.

(21) Appl. No.: 09/953,594

(22) Filed: Sep. 17, 2001

(65) Prior Publication Data

US 2003/0051608 A1 Mar. 20, 2003

(51) Int. Cl.[7] ................................................ A47J 37/08
(52) U.S. Cl. ............................. 99/394; 99/395; 99/397; 99/418; 99/426; 99/450
(58) Field of Search .......................... 99/394, 395, 396, 99/339, 409, 418, 426, 427, 439, 450, 397

(56) References Cited

U.S. PATENT DOCUMENTS

| | | | | |
|---|---|---|---|---|
| 418,666 A | * | 1/1890 | Ams ........................... | 99/450 |
| 1,076,383 A | * | 10/1913 | Mendez ....................... | 99/426 |
| 1,319,373 A | * | 10/1919 | Blaschke ..................... | 99/409 |
| 4,773,316 A | * | 9/1988 | Dougherty ................... | 99/409 |

* cited by examiner

Primary Examiner—Reginald L. Alexander
(74) Attorney, Agent, or Firm—Cristina M. Offenberg, Esq.

(57) ABSTRACT

A novel grill top cooking tool is provided that contains and cooks food on a grill surface. The grilling tool is comprised of a main body with removable perforated or slotted end caps that are secured to either edge of the main body. An attaching device allows for connection of a detachable tool to place the grilling tool on a hot surface and for turning the grilling tool during the cooking process and removing the grilling tool when finished cooking.

4 Claims, 5 Drawing Sheets

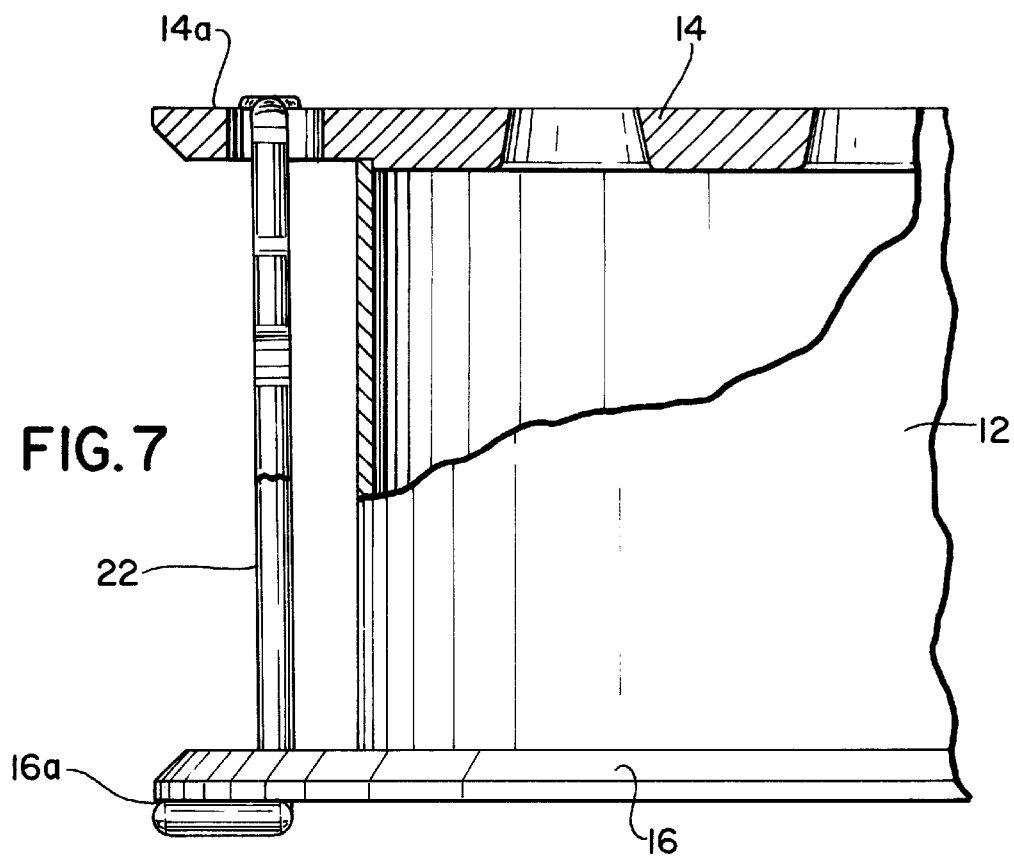
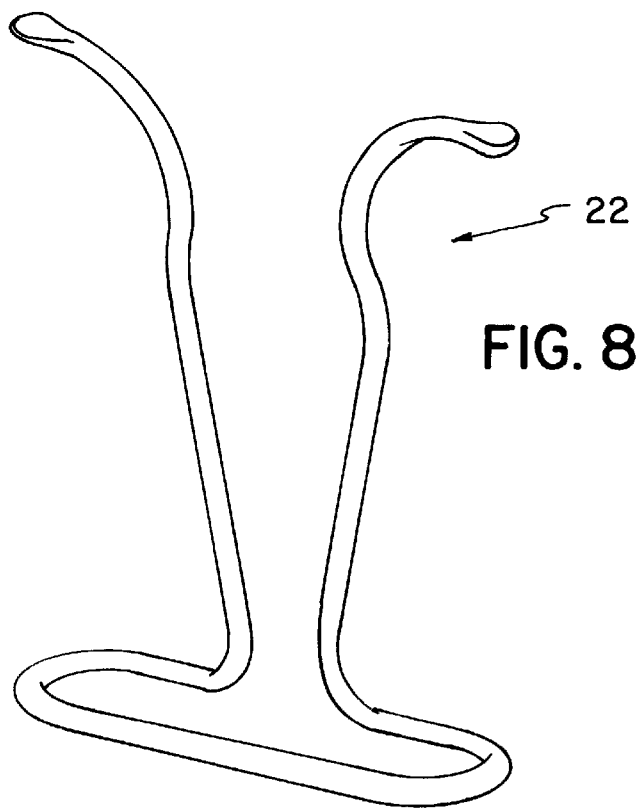

GRILL TOP COOKING TOOL

FIELD OF INVENTION

The present invention relates generally to cooking tools and, particularly, to grill top cooking tools.

BACKGROUND OF THE INVENTION

This invention relates to grill top a cooking tool and the accompanying hardware. The term cooking tool as used herein is intended to define a device used in preparing and cooking of food and, particularly, one for use on a grilling surface.

Grill top cooking has been in existence for a very long time and many devices have been invented to aid a cook in cooking on a grill as it differs from cooking on a frying pan, electric skillet or stove top. This cooking tool functions in a way that contains and cooks food on a grill surface. It was invented to allow a chef or home cook a new way to enjoy grilled foods.

Grilling has become an incredibly popular way to cook foods. However, as with all cooking methods, there are limitations to the process. An uneven heat source and foods that do not all lie flat on the grill, make grill cooking a difficult thing to achieve with consistency. Flavorings applied externally to foods (e.g. spices, herb marinades) can easily burn off on a grill. The subject invention is a tool that provides a new way of cooking on the grill and addressing these problems. The subject invention is a round grilling tool that has removable slotted end caps. In order to use the tool, meats, fish or poultry are cut into strips or pieces allowing for more surface area to be coated and for the meat, fish, or poultry to be more easily molded into the subject cooking tool. The meat, fish or poultry can then be layered into the cooking tool offering interesting entrees that offer a variety of color, texture, and a blending of flavors. Any food such as vegetables or herbs may be layered with the main course and cooked together.

SUMMARY OF THE INVENTION

The present invention responds to the problems presented and fills a need not addressed in the prior art by providing a grill top cooking tool which is round in shape and approximately a diameter of three and three-quarters (3 ¾) inches by two (two) inches high in the preferred embodiment other shapes could also be used to cook food but round would be preferred embodiment. Both the height and diameter can be increased or decreased depending on the type of cooking that needs to be done. The edges of preferred embodiment described in the drawings is sufficiently high to allow for vegetables placed in the center of the tool to be cooked al dente. A thinner version of the tool with more surface area, i.e. a larger diameter, would allow for more of the food to be directly exposed to the coals of the grill.

Many grilled foods are traditionally bathed or soaked in a marinade first. These marinades are often acidic in nature and usually contain lemon juice or a vinegar source, therefore, the surface of the tool that is exposed to the food should be non-reactive to acid. Additionally, high heat accelerates the acids' ability to dissolve out certain metals. The preferred embodiment is constructed of an eighty thousandths thickness of copper clad with a ten thousandths thickness of a non-reactive metal such as fine silver or stainless steel. Other non-reactive coatings can be used such as Teflon, vitreous enamel or some type of ceramic material-anodized aluminum may also be a possibility. The thickness described is used in the preferred embodiment but may also be changed. Clad copper and clad aluminum would be the most ideal materials from which to fabricate this grilling tool. The outer layer of copper or aluminum are great conductors of heat. The inner layer of stainless steel which is exposed to the food is non-reactive to acid and, therefore, safe to use with any food product. As previously mentioned, the tool can be made of other materials. Steel alloys coated with porcelain enamel or enameled copper would also work. Cast iron is another possible metal Thin gauge stainless steel will work but it is not as efficient as the more conductive metals. The tool should be constructed of a conductive metal on the outer layer and a non-reactive metal on the inner layer for optimum performance. Each of these possible choices is associated with different costs and, therefore, there could be two possible lines of the product: one low-end, low cost version for the back yard grilling cook and another high-end, high cost model for the professional chef The top and bottom end caps are constructed of similar materials as the main section. It should be noted that the top and bottom also serve to conduct heat to food contained within the tool.

The subject invention is a round or oval metal ring that has two perforated or slotted end caps which are removable. The first end cap is secured in place prior to layering food into the tool. In order to use the tool, meats, fish or poultry are cut into strips or pieces allowing for more surface area to be cooked and for meat, fish, or poultry to be more easily molded into the subject cooking tool. The meat, fish or poultry can then be layered into the cooking tool with a different vegetable, herbs, or other food thereby producing meals with a variety of color, texture, and blending of flavors. The containment of the foods in this grilling tool assures a more moist and flavorful result. The perforated or slotted end caps that fit both the top and bottom interchangeably allow for the penetration of smoke. The end caps that are perforated or slotted allow for turning over of the tool and create the signature grill marks that chefs and consumers like to see on grilled food. After the cooking is complete, the end caps are removed to allow for the easy removal of the food package. There are many uses for this tool in the grilling industry. There is no limitation as to the type of foods that can be grilled in this tool. Foods that are not traditionally grilled (such as fruit, polenta, or legumes) or too small to grill on traditional grill top can now be grilled in the subject invention.

Another feature of the grilling tool is that it allows for portion control. In the restaurant industry this is a very important concern. Profit margins in restaurants are slim and foods that can be marinated, weighed, and measured prior to cooking, can be prepacked in the grilling tool then placed in a walk-in refrigerator while waiting for customer orders.

Another benefit of the grilling tool is that it provides a beautiful presentation of the food contents. Again, in the restaurant industry, presentation is just as important as taste to many consumers. Often when a customer does not like the appearance of an entreé, it is sent back to the kitchen without being tasted. When the end caps are removed after grilling the resulting package of food maintains the shape of the grilling tool. Upon removal from the tool the layers of food are clearly visible and provide a beautiful display.

Another feature of the grilling tool is the detachable gripping device which allows for a cook or chef to place the grilling tool onto a hot surface and to turn over the tool so both sides are in contact with the grilling surface. Grill space in restaurants and even in back yards is often at a premium. A gripping device that attaches when the tool is being placed on the grill and during the flipping of the tool and then detached when the food is cooking leaves extra grill space available. The grilling tool could be flipped over with a spatula, however, food contamination is a concern with a spatula that has first come into contact with raw meats, fish and poultry and then into contact with cooked food. The detachable gripping device is a safe way to avoid contamination.

The invention provides a novel cooking tool that provides a new way of grilling food including the following novel features: 1) a tool that provides a non-reactive surface so that the food product may be marinated or coated; 2) a more moist and flavorful food package; 3) a meal with a variety of color, texture, and blending of flavors; 4) the containment of the foods allows for cooking foods that are traditionally difficult to cook on a grill; 5) a presentation of the food that is aesthetically pleasing; 6) portion control of the food contained within the tool; 7) a grilling tool that provides efficient use of grill space. All other novel features which are believed to be characteristic of the invention are set forth in the appended claims. It is believed the invention will be best understood by reference to the following description take in connection with the accompanying drawings.

BRIEF DESCRIPTION OF THE DRAWINGS

FIG. 7 is a partial view of the device with a cut away section showing the retaining clips are flush with surface of end cap FIG. 8 is a plain view showing clip release mechanism

DETAILED DESCRIPTION OF THE DRAWINGS

Figure 1:
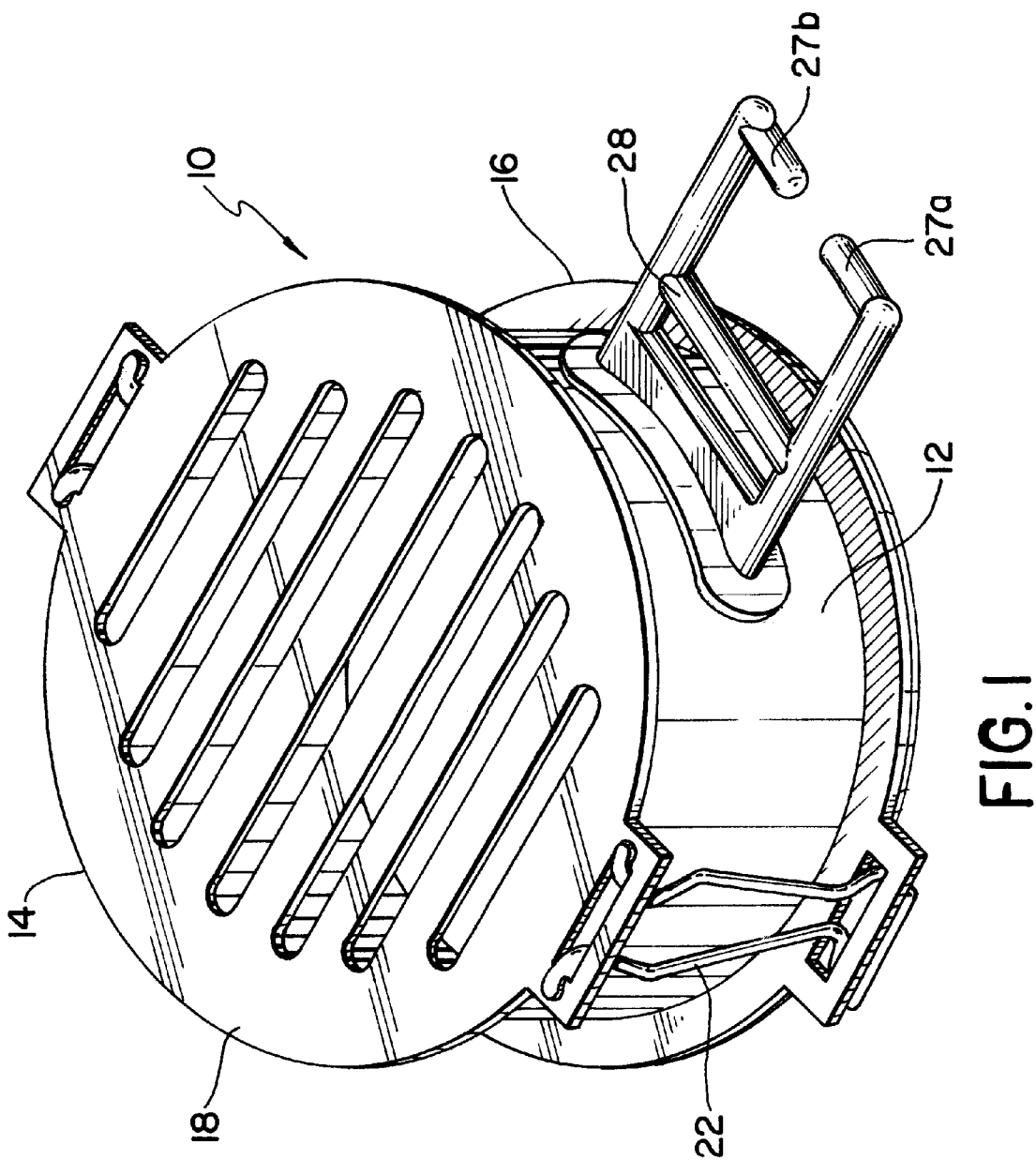
FIG. 1 is a perspective view of the grilling tool.

In all the drawings, like elements are labeled with the same reference numbers. FIG. 1, illustrates the grilling tool 10 with the main body 12 shown as circular. The first end cap 14 is placed adjacent to the top edge of the main body and the second end cap is placed adjacent to the bottom edge of the main body 16. The first end cap 14 and second end cap 16 are secured to the main body by way of a first locking device 22 and second locking device 24 (not shown in FIG. 1). An attaching device 26 which is a holding means for a gripping tool is shown permanently secured to the side of the main body and positioned between the first locking device and second locking device. The attaching device 26 allows for a detachable gripping tool to be placed within the two keepers 27a, 27b, and secured onto the bar 28 so the grilling tool can be placed onto a hot surface and turned over during cooking to prevent the user from burning one's hand. The gripping tool has holes on the end for the first keeper 27A and second keeper 27B to fit into the holes and clamp onto bar 28.

Figure 3:
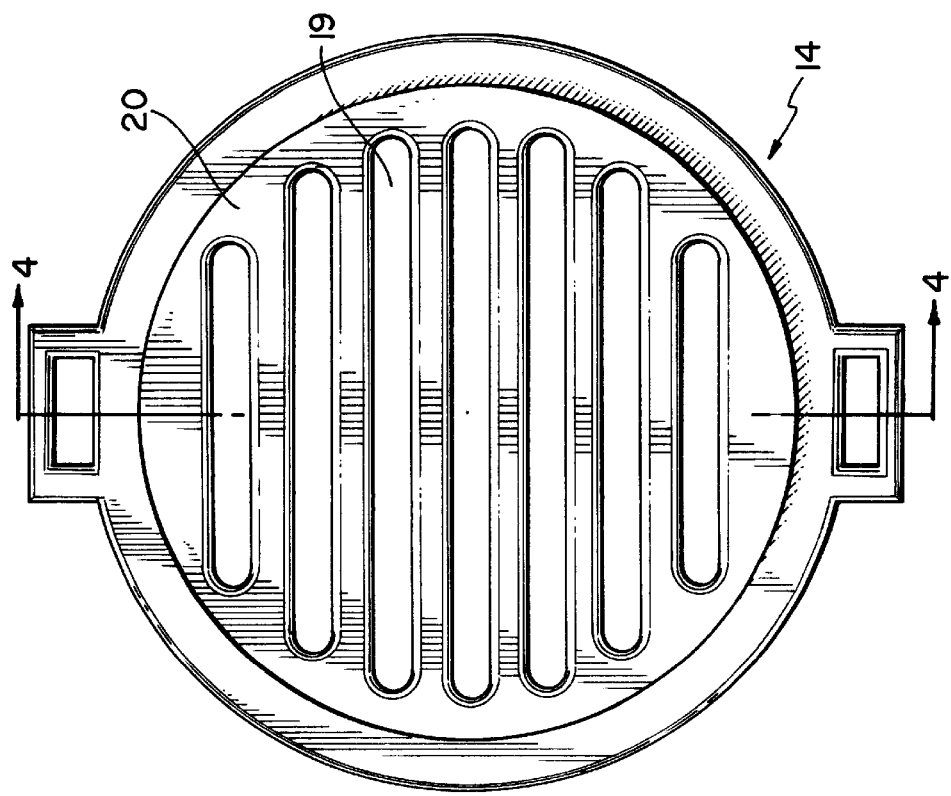
FIG. 3 is a bottom view of end cap
Figure 2:
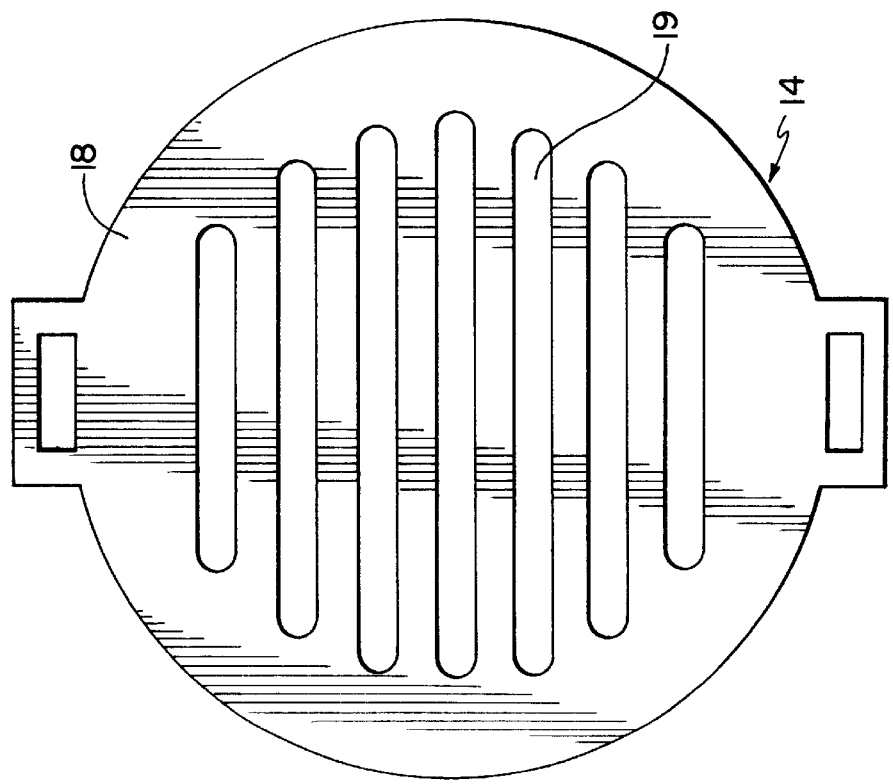
FIG. 2 is a top view of end cap

FIGS. 2 and 3 show the outer side 18 and inner side 20 of the first end cap 14. The outer side 18 is a round, smooth surface which comes into contact with the grilling surface. The end cap has cut into the cap a plurality of slots or perforations 19 to allow for the smoke from the grill to reach the food within the tool, and to provide juices to be released.

The slots or perforations also provide a grilling effect to the food product. The inner side 20 of the first and second end caps have the downward protrusion for easy centering since the first and second end caps come into contact with the food product. The first and second end caps are coated with non-reactive material so food acid in food products does not dissolve the metal.

Figure 4:
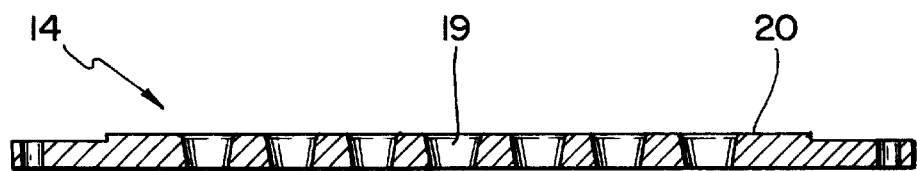
FIG. 4 is a cross section of FIG. 3 at point A—A

FIG. 4, illustrates a cross section of the end caps showing the plurality of slots or perforations cut into the depth of the end cap 14.

Figure 5:
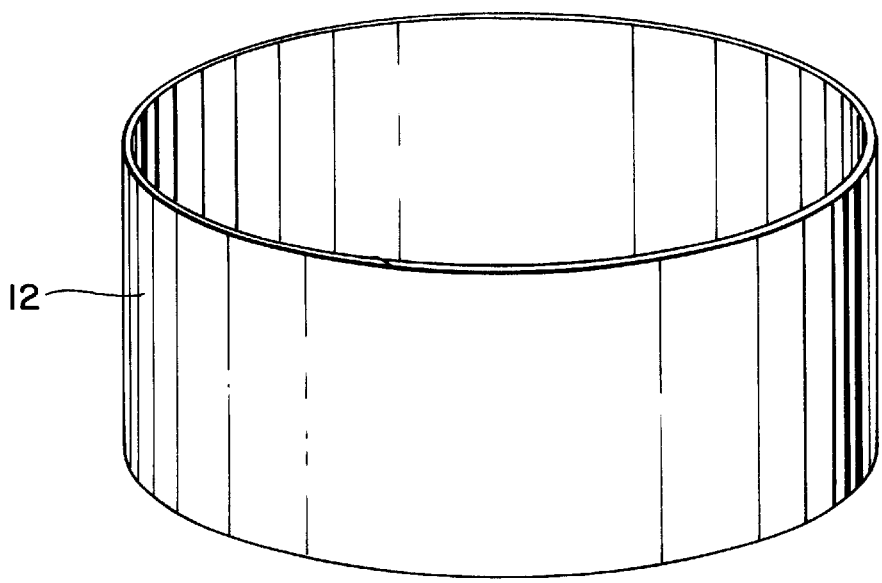
FIG. 5 is a circular main body of the grilling tool

FIG. 5 is a front view of the main body 12 of the grilling tool. The main body 12 is annular and comprised of two adhered layers of material. The inner layer is a non-reactive material so that the acid in the food product does not dissolve the metal. The outer layer is a conductive metal to allow the heat from the grill to cook the food within the main body 12.

Figure 6:
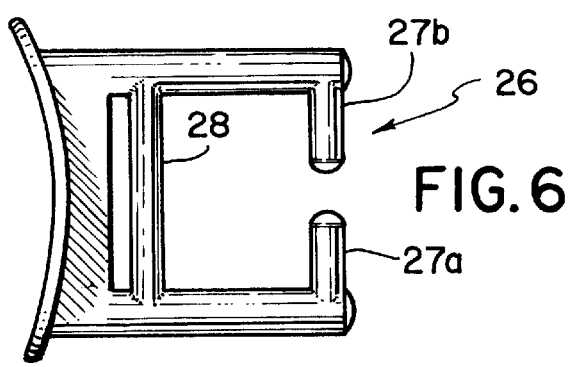
FIG. 6 is the holding device for the removable handle

FIG. 6 is a top view of the attaching device 26 which is a holding means for the detachable gripping tool. The attaching device 26 is permanently adhered to the side of the grilling tool between the locking mechanisms. A gripping tool is designed to easily fit within the keepers 27a and 27b and bar 28 to pick up or turn the grilling tool. The user can then place the grilling tool onto the hot surface and then release the gripping tool from the keepers and remove the gripping tool. When the food is ready to be turned over, the user reattaches the gripping tool to the keepers and flips over the grilling tool or removes it from the hot surface.

FIG. 7 is a partial view of the grilling tool with a cut away showing the locking mechanism 22 being below the outer edge of the first end cap 14a and second end cap 16a. The locking mechanism 22 will either be flush with or below the outer edge of the end covers 14 and 16. The locking mechanism could be a variety of mechanisms designed to secure the first and second end cap on the main body 12. FIG. 8 shows the preferred embodiment, the locking mechanism 22 is a one piece clip that is squeezed and fits into a slot in the bottom end cap and fed up so the top of the clip fits into a slot in top end cap and when clip is released it is securing both end caps to the main body 12. A spring mechanism or other clasp could also serve the same purpose. Also the end caps could be hinged to the main body but it would make filling top loaded food difficult and make it difficult to clean.

Figure 9:
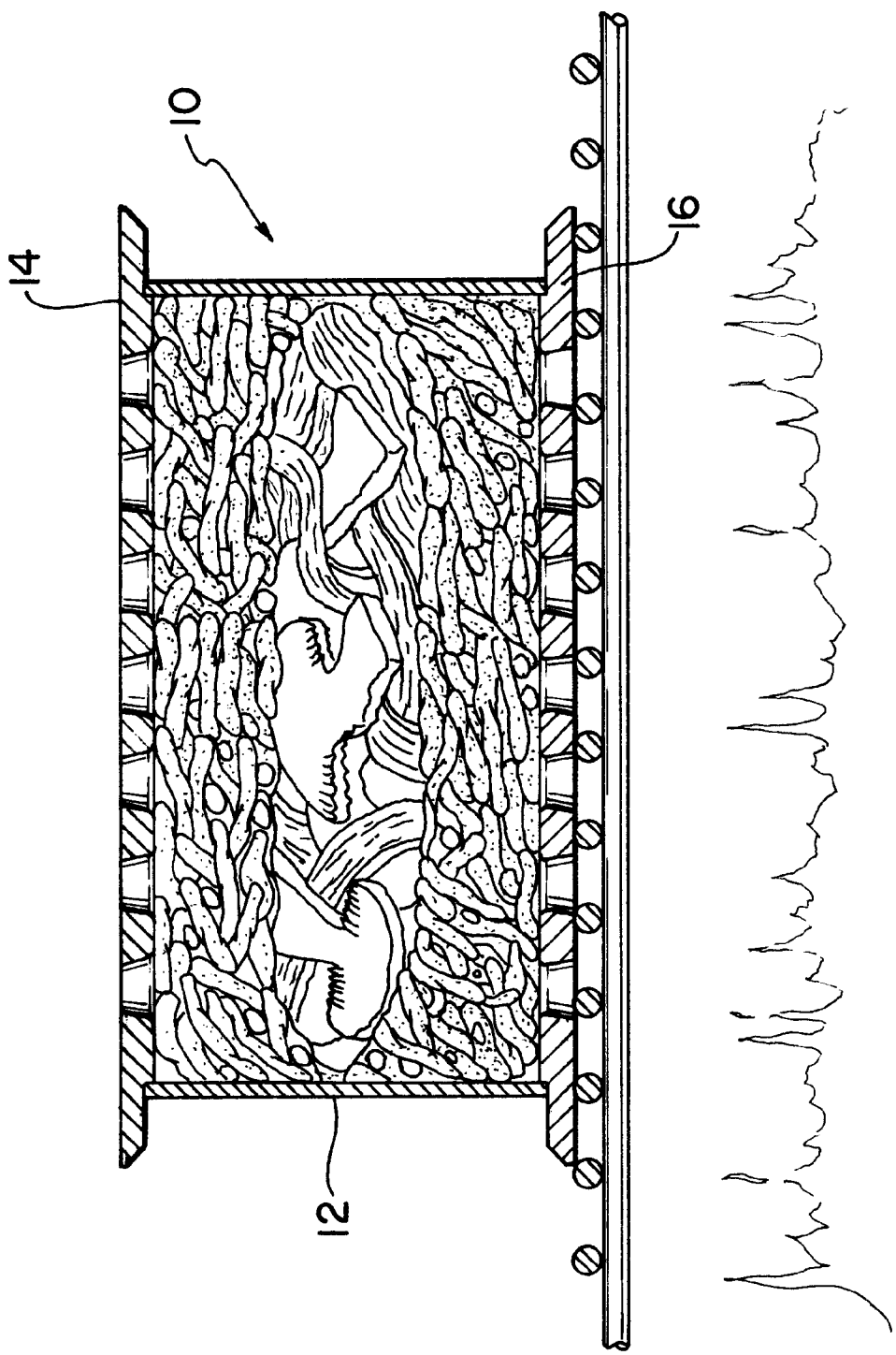
FIG. 9 is a cross section at the midpoint of the grilling tool with layered food

FIG. 9 illustrates a cross section of the grilling tool 10 with layered foods within the interior of the main body 12. The end caps 14 and 16 are shown secured to the main body 12 to hold the food within the interior of the grilling tool 10 during cooking.

What is claimed is:

1. A novel grilling tool in the form of a self-contained enclosure allowing for balanced heat distribution with surfaces inert to food acid attack, and with removable top and bottom end caps for food loading and unloading comprising a solid main body of two adhered layers of resilient material having a top edge and a bottom edge;

a first end cap placed adjacent to the top edge of the main body;

a second end cap placed adjacent to the bottom edge of the main body;

at least one locking mechanism to secure the first end cap to the top edge of the main body and secure the second end cap to the bottom edge of the main body; and a detachable gripping tool that temporarily attaches to a holding means secured to an outer side of the main body that allows for movement of the grilling tool onto a grill top, off of a grill top, and to turn over the grilling tool.

2. A grilling tool as claimed in claim 1 further comprising a holding means attached to an outer side of the main body that allows for a removable gripping tool to temporarily attach to the holding means for movement of the grilling tool on and off of a grill top and to turn over the grilling tool.

3. A grilling tool as claimed in claim 1 wherein said locking mechanism secures the first end cap to the top edge of the main body and secures the second end cap to the bottom edge of the main body of the grilling tool by means of a slot made in an edge the first end cap within which a clip specifically shaped to have a closed end and an open end and the clip fits through the slot of the second end cap and feeds through to a slot made in an edge of the first end cap when the clip is released holding the second end cap to the bottom of the main body and the first end cap to the top of the main body.

4. A grilling tool as claimed in claim 1 wherein the first and second end caps are provided with perpendicular slots or perforations to allow heat and smoke to pass from the grill through the second end cap, into the food and out the first end cap.

* * * * *